United States Patent
Kenthapadi et al.

(10) Patent No.: US 10,261,971 B2
(45) Date of Patent: Apr. 16, 2019

(54) PARTITIONING LINKS TO JSERPS AMONGST KEYWORDS IN A MANNER THAT MAXIMIZES COMBINED IMPROVEMENT IN RESPECTIVE RANKS OF JSERPS REPRESENTED BY RESPECTIVE KEYWORDS

(71) Applicant: Microsoft Technology Licensing, LLC, Redmond, WA (US)

(72) Inventors: Krishnaram Kenthapadi, Sunnyvale, CA (US); Huan Van Hoang, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 232 days.

(21) Appl. No.: 15/164,626

(22) Filed: May 25, 2016

(65) Prior Publication Data
US 2017/0344647 A1    Nov. 30, 2017

(51) Int. Cl.
G06F 16/958 (2019.01)
G06F 16/9535 (2019.01)
H04L 29/08 (2006.01)
G06F 16/2457 (2019.01)

(52) U.S. Cl.
CPC .... *G06F 16/9535* (2019.01); *G06F 16/24578* (2019.01); *G06F 16/958* (2019.01); *H04L 67/02* (2013.01); *H04L 67/306* (2013.01)

(58) Field of Classification Search
CPC .................................................. G06F 17/3053
See application file for complete search history.

(56) References Cited

U.S. PATENT DOCUMENTS

| 8,504,559 | B1 * | 8/2013 | Elman | G06Q 30/08 707/722 |
| 9,161,066 | B1 * | 10/2015 | Oztaskent | H04N 21/24 |
| 2003/0009295 | A1 * | 1/2003 | Markowitz | G06F 19/28 702/20 |
| 2011/0029511 | A1 | 2/2011 | Kodialam et al. | |
| 2014/0188608 | A1 * | 7/2014 | Unger | G06F 17/30867 705/14.54 |
| 2017/0061381 | A1 * | 3/2017 | Kenthapadi | G06Q 10/1053 |
| 2017/0344551 | A1 | 11/2017 | Kenthapadi et al. | |

OTHER PUBLICATIONS

"Non Final Office Action Issued in U.S. Appl. No. 15/164,646", dated Aug. 8, 2018, 15 Pages.

* cited by examiner

*Primary Examiner* — Hung Q Pham
(74) *Attorney, Agent, or Firm* — Schwegman Lundberg & Woessner, P.A.

(57) ABSTRACT

An on-line social network system includes or is in communication with a search engine optimization (SEO) system that is configured to partition a number of available links from authoritative web pages to Job Search Results Rages (JSERPs) in a way that maximizes combined improvement in respective ranks generated by a third party search engine for JSERPs represented by keywords from the set of keywords.

14 Claims, 7 Drawing Sheets

PARTITIONING LINKS TO JSERPS AMONGST KEYWORDS IN A MANNER THAT MAXIMIZES COMBINED IMPROVEMENT IN RESPECTIVE RANKS OF JSERPS REPRESENTED BY RESPECTIVE KEYWORDS

TECHNICAL FIELD

This application relates to the technical fields of software and/or hardware technology and, in one example embodiment, to system and method to partition a limited resource amongst keywords for use in the context of an on-line social network system.

BACKGROUND

An on-line social network may be viewed as a platform to connect people and share information in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and education of the associated member. An on-line social network may store include one or more components for matching member profiles with those job postings that may be of interest to the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
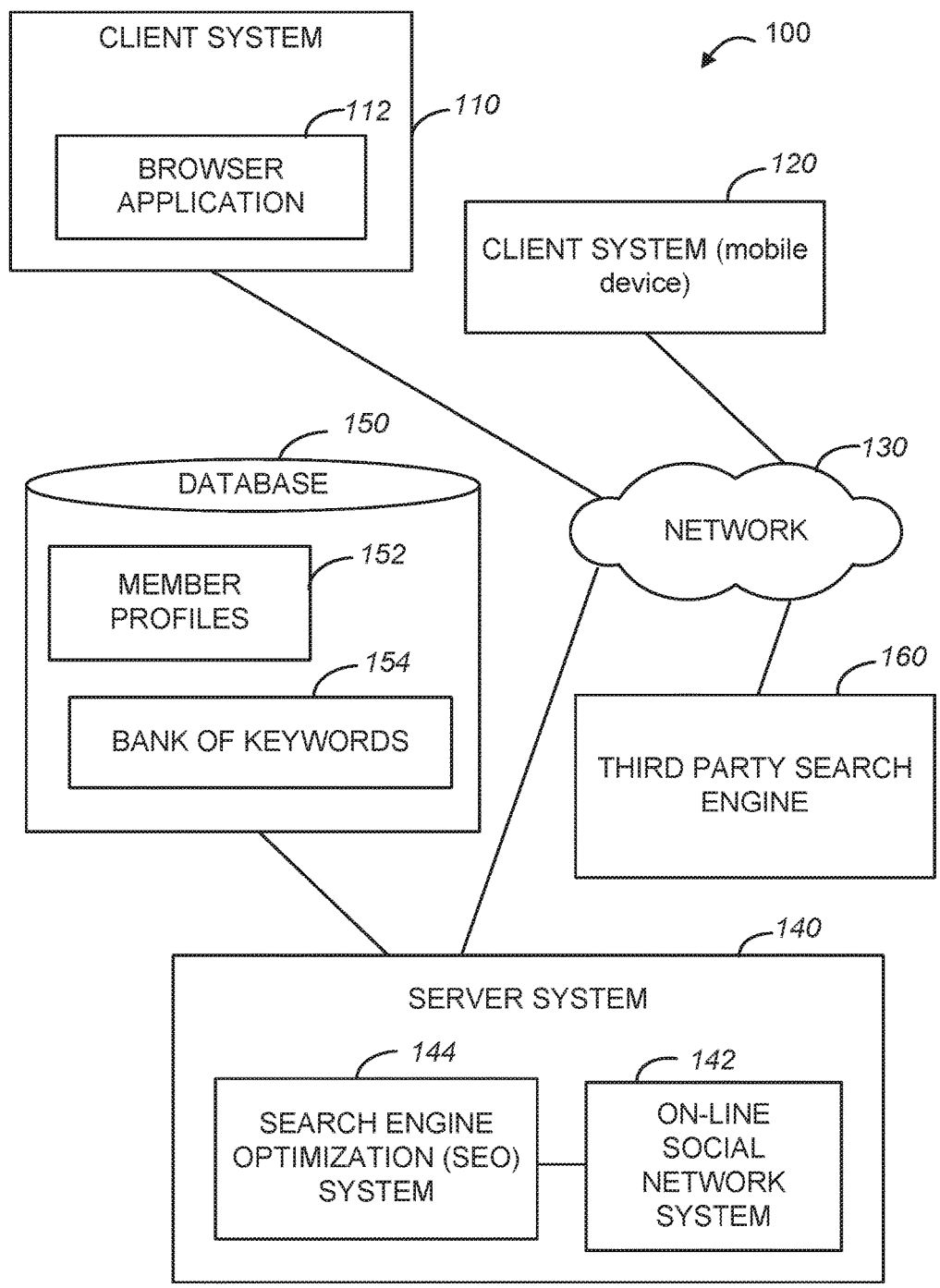
FIG. 1 is a diagrammatic representation of a network environment within which an example method and system to partition a limited resource amongst keywords in an on-line social network system may be implemented.

A method and system to partition a limited resource amongst keywords in an on-line social network system is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrases "an on-line social networking application" and "an on-line social network system" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate the member's connection to other members of the social network. A member profile may also include or be associated with comments or recommendations from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Members that are connected in this way to a particular member may be referred to as that particular member's connections or as that particular member's network. The profile information of a social network member may include various information such as, e.g., the name of a member, current and previous geographic location of a member, current and previous employment information of a member, information related to education of a member, etc.

The on-line social network system also maintains information about various companies, as well as so-called job postings. A job posting, also referred to as merely "job" for the purposes of this description, is an electronically stored entity that includes information that an employer may post with respect to a job opening. The information in a job posting may include, e.g., industry, company, job position, required and/or desirable skills, geographic location of the job, etc. Job postings in the on-line social network system may be accessible to users via a job search directory web page that displays a keyword-based alphabetical index. Members may access job postings associated with a particular keyword by entering the keyword into the search box and examining the returned search results. Another way to access job postings associated with a particular keyword is to navigate to a web page representing the job search directory and click on (or otherwise engage) a link represented by the keyword of interest, which would cause presentation of references to the job postings containing that keyword.

While the on-line social network system may be used beneficially to assist its members in their job searches, a person who may be considered an active job seeker may not necessarily be a member of the on-line social network system. At the same time, active job seekers, even if they are not yet members, may benefit when a search using an on-line search engine returns, as results, job postings maintained by the on-line social network system. The on-line social network system may be configured to provide to users, regardless of their membership with the on-line social network system, a rich job search experience where JSERPs (job search results pages) that originate from the on-line social network system are ranked at the top of the search results.

Figure 5:
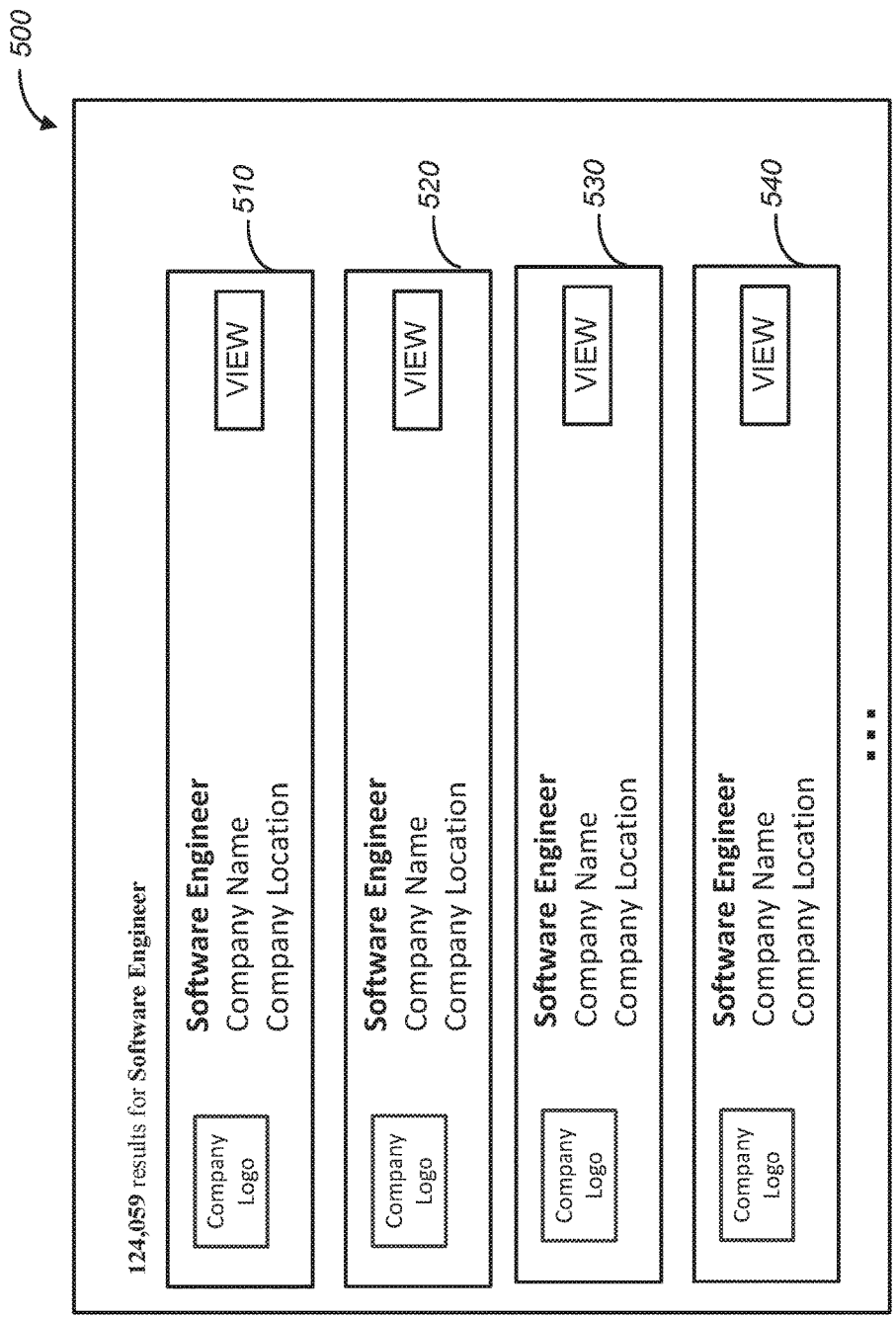
FIG. 5 is an example representation of a JSERP.
Figure 6:
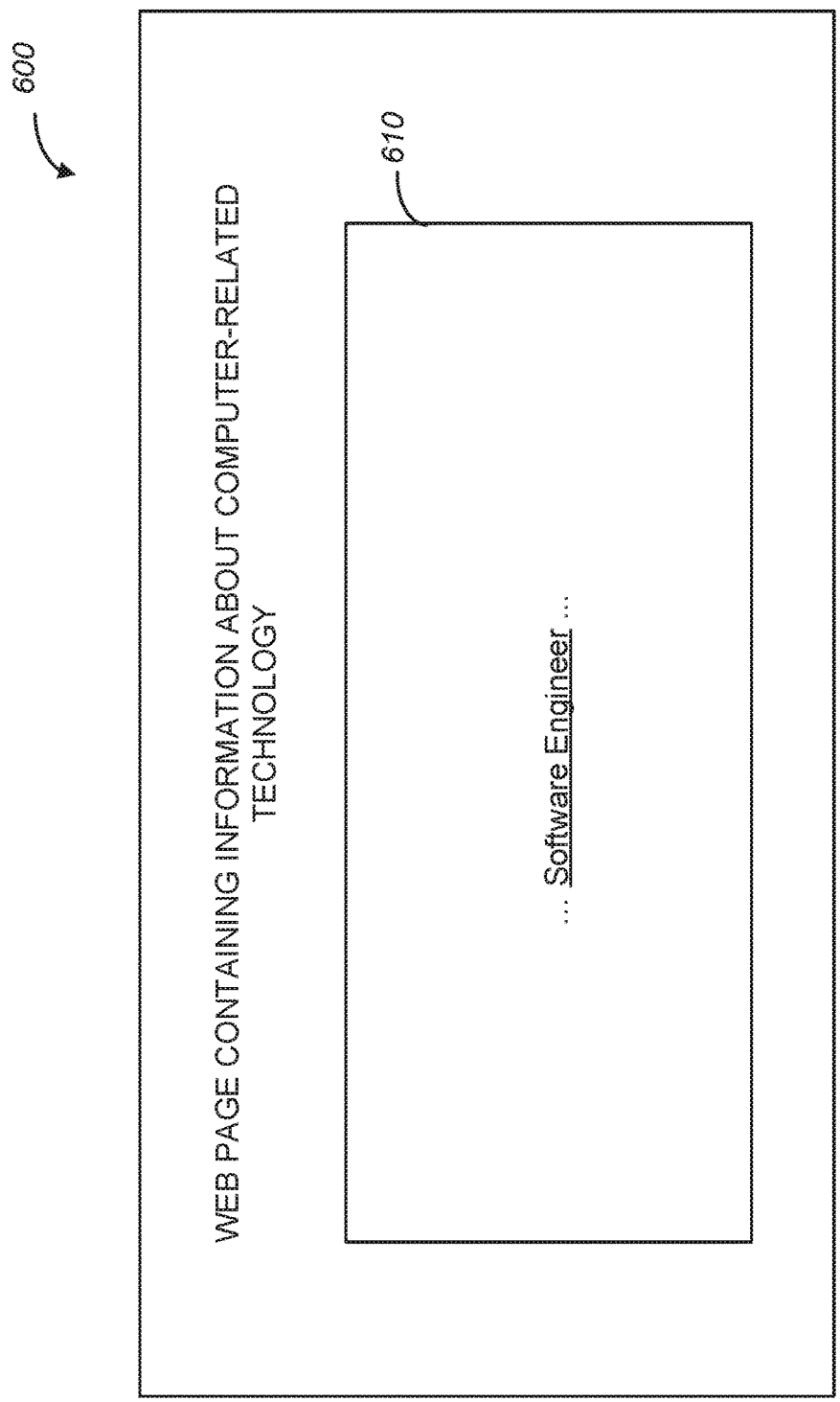
FIG. 6 is an example representation of a user interface for navigating to a JSERP from another web page.

A JSERP is a web page that includes references to job postings associated with a certain job-related search term. In this sense, each JSERP represents a particular job-related search term. A job-related search term is referred to as a "job-related-keyword" or merely "keyword" for the purposes of this description, even though it may be a single word (e.g., "engineer") or multiple words (e.g., "software architect"). References to JSERPs can be presented to users in a list of search results, in response to a user's job-related search request. JSERPs can also be accessed via the on-line social network system web site. For example, in response to a search request for "software engineer" jobs directed to the on-line social network system, the user is presented with an associated JSERP, an example of which is shown in FIG. 5. The presentation 500 in FIG. 5 is a JSERP associated with the keyword "software engineer." The search results shown in this JSERP include references 510, 520, 530, and 540 that represent different job postings for software engineer jobs. The JSERP shown in FIG. 5 can also be accessed from another web page if it includes a hyperlink (link) to that JSERP. The hypertext associated with the link is a job-related keyword associated with that JSERP. In this example, a job-related keyword associated with the JSERP shown in FIG. 5 is "software engineer." FIG. 6 is an example representation of a user interface 600 for navigating to the JSERP associated the keyword "software engineer" from a so-called topic page that contains information about computer-related technology. A user can navigate to the JSERP associated the keyword "software engineer" (shown in FIG. 5) from the topic page shown in FIG. 6 by clicking on (or otherwise engaging) a link represented by the keyword "software engineer."

Thus, another way to permit users to access JSERPs and increase the exposure of the JSERPs is to include links to one or more JSERPs into other web pages generated by the on-line social network system, e.g., into topic pages, people pages, etc.—generally into those pages that are known or are expected to be attracting a lot of traffic. These pages that are known or are expected to be attracting a lot of traffic are referred to as authoritative pages, as they are treated as such by search engines and are thus given relatively high PageRank scores by the search engines. Including links to JSERPs into the authoritative pages may be beneficial, because pages that are linked to the authoritative pages are treated as endorsed by the authoritative pages and, as a result, may receive increased respective PageRank scores. A PageRank score given to a web page by a search engine is referred to as a rank for the purposes of this description. Just like the authoritative web pages, the JSERPs (and thus the associated keywords) are also given respective ranks, collectively ranks R, by the search engine (a JSERP receives a rank r). The links to the JSERPs can be provided in the form of keywords represented by the respective JSERPs. When a JSERP is linked to an authoritative web page, a user can access the JSERP from the authoritative web page by clicking or by hovering over the associated keyword.

The total number of such links that can be reasonably included into the authoritative pages is a limited resource, because including more than a certain number of links into an authoritative web page may be distracting to users and may also negatively affect the third-party search engine ranking of the authoritative page. It therefore may be beneficial to determine how to partition this limited resource amongst the keywords represented by the respective JSERPs in a way that maximizes a benefit (also referred to as gain) expressed by a predetermined metric. A metric may be, e.g., the overall gain in the number of job views/applications or confirmed hires, or an improvement in respective ranks generated for the JSERPs by a third party search engine. The keywords represented by the respective JSERPs are referred to as job-related keywords for the purposes of this description.

In one example embodiment, the on-line social network system includes or is in communication with a search engine optimization (SEO) system that is configured to partition the limited resource of total available links to the JSERPs from authoritative pages amongst job-related keywords, in a way that maximizes gain expressed by a predetermined metric, as mentioned above, such as, e.g., the number of job views/applications or confirmed hires. The limited resource of total available links is referred to as the SEO resource, when SEO is utilized. The partitioning of the SEO resource is addressed as a constrained optimization problem that is solved to maximize gain expressed by a predetermined metric. The gain in the predetermined metric is computed as a function of allocated SEO resource.

SEO determines allocation of links from the total available links T amongst job-related keywords $W(w_1, \ldots, w_n)$, such that the condition expressed in Equation 1 below is satisfied or approached.

$$\max_{\alpha} \sum_{w \in W_{jobs}} v(w) \times g(\alpha(w), r(w)) \qquad \text{Equation (1)}$$

In the Equation 1 above, Wjobs denotes a set of job-related keywords $w_1, \ldots, w_n$, for which JSERPs are being generated For each $w \in$ Wjobs, v(w) denotes the priority score of the keyword w. Respective priority scores for job-related keywords are generated by SEO and used for enhancing the users' on-line job search experience.

For example, respective priority scores for job-related keywords may be computed using a probabilistic model that takes into account a value expressing how likely the keyword is to be included in a search query as a search term and a value expressing how likely is a search that includes the keyword as a search term is to produce relevant results. A value expressing how likely the keyword is to be included in a search query as a search term may be referred to as a popularity score. A value expressing how likely a search that includes the keyword as a search term is to produce relevant results may be referred to as a relevance score. In some embodiments, the priority score for a keyword may be generated by multiplying the relevance score for a keyword by the popularity score for that same keyword, e.g. using Equation 2 shown below.

$$\text{PriorityScore}(w) = Pr(\text{RELEVANT} \& w) = Pr(w) * Pr(\text{RELEVANT}/w), \quad \text{Equation (2)}$$

where w is a keyword, Pr(w) is probability expressing the popularity score for the keyword w, and Pr(RELEVANT/w) is probability expressing the relevance score for the keyword w.

Returning to Equation 1 above, α (which is calculated for keywords W having respective ranks R, α: W→R) denote the assignment function for the SEO resource. For keyword w, α(w) is the amount of SEO resource (the number of links to the JSERP represented by w) allocated to w.

The constrained optimization problem expressed in Equation 1 may be solved for the binary assignment function α, where either one link is allocated to the JSERP corresponding to w, or no links are allocated to the JSERP corresponding to w. In some embodiments, α(w) can denote the number of authoritative pages from the on-line social network system that link to the JSERP represented by the keyword w (and hence could be greater than 1). Also in the Equation 1 above, r denotes the rank of the JSERP represented by the keyword w, and g denotes the gain in a predetermined metric when α amount of SEO resource (e.g., one link, or two links, etc.) is assigned to the JSERP represented by the keyword w with current rank r assigned by the third party search engine. In operation, keywords may be grouped based on their respective ranks when allocating to each of them a certain number of links (zero links or more) and monitoring the change in a selected metric resulting from the allocating. An average gain for the entire group of keywords having the same rank may then be used determines in the allocation of all available links using the Equation 1.

In one embodiment, the gain function g satisfies the following properties:
1. Diminishing returns with SEO resource: as the SEO resource rank r increases, the increase in the job metric gain g per each added SEO resource diminishes, assuming that the rank r is fixed.
2. The greater impact of each added SEO resource to a keyword is observed for lower-ranked keywords. In other words, for a fixed SEO resource rank r, the gain g is greatest for keywords for which the current rank is among the lowest (for example, rank r=1 may be considered to be the highest rank and ranks r=99 or r=100, etc., may be considered to be among the lowest ranks) that is, the gain g increases with the increase of the absolute value of rank r.

The gain function g can be defined as, e.g., the average gain in job applications, the average gain in job views, the average gain in confirmed hires, or some other selected metric. In some embodiments, the gain function g can be defined differently for each keyword w, such as $g_1$ representing gain in job applications corresponding to w, $g_2$ representing gain in job views corresponding to w, $g_3$ representing gain in the search engine rank for w. For each of these choices, the gain g(α(w), r(w)) can be estimated empirically by, for each keyword, assigning a certain number of links to the keyword, monitoring the selected metric over a period of time, measuring the effect on the gain function, and then repeating the process for another number of assigned links.

In some embodiments, the gain function g can be defined as, the improvement in respective ranks of JSERPs generated by a third party search engine (e.g., generated by Google®). This approach is discussed below with reference to FIG. 4.

In the scenario where the assignment function α is binary, the SEO is configured to compute, for each keyword w, the weighted gain as v(w)×g(1, r(w)), where v(w) is the priority score computed for the keyword w and r(w) is the rank assigned to the keyword w by a third party search engine. Given the total number T of available links, the SEO selects the T number of keywords having the top T weighted gain values and distributes the T number of links evenly amongst the selected T number of keywords.

In the scenario where the assignment function α can be 1 or greater, the constrained optimization problem expressed in Equation 1 is solved using dynamic programming. For example, the constrained optimization problem expressed in Equation 1 can be solved by breaking it down into a collection of simpler sub-problems (such as, selecting a set of assignment functions, computing the weighted gain for each keyword using each assignment function from the set, storing respective outcomes, and computing the maximum weighted gain across the variation of the assignment functions).

An example SEO system may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152. Job-related keywords associated with respective JSERPs are may be stored in the database 150 as a bank of keywords 154.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a search engine optimization (SEO) system 144. As explained above, the SEO system 144 may be configured to partition a limited resource amongst keywords based on their respective predicted contribution to the ranking of JSERPs using the methodologies described above. The SEO system 144 utilizes, in some embodiments, respective PageRank scores that a third party search engine 160 generates for various web pages created by the on-line social network system 142. The third party search engine 160 may be hosted by a third party server system that is distinct from the server system 140. An example of a third party search engine is Google®. An example of an on-line social network system is LinkedIn®. An example SEO system, which corresponds to the SEO system 144 and which is configured to partition a limited resource amongst keywords in an on-line social network system is illustrated in FIG. 2.

Figure 2:
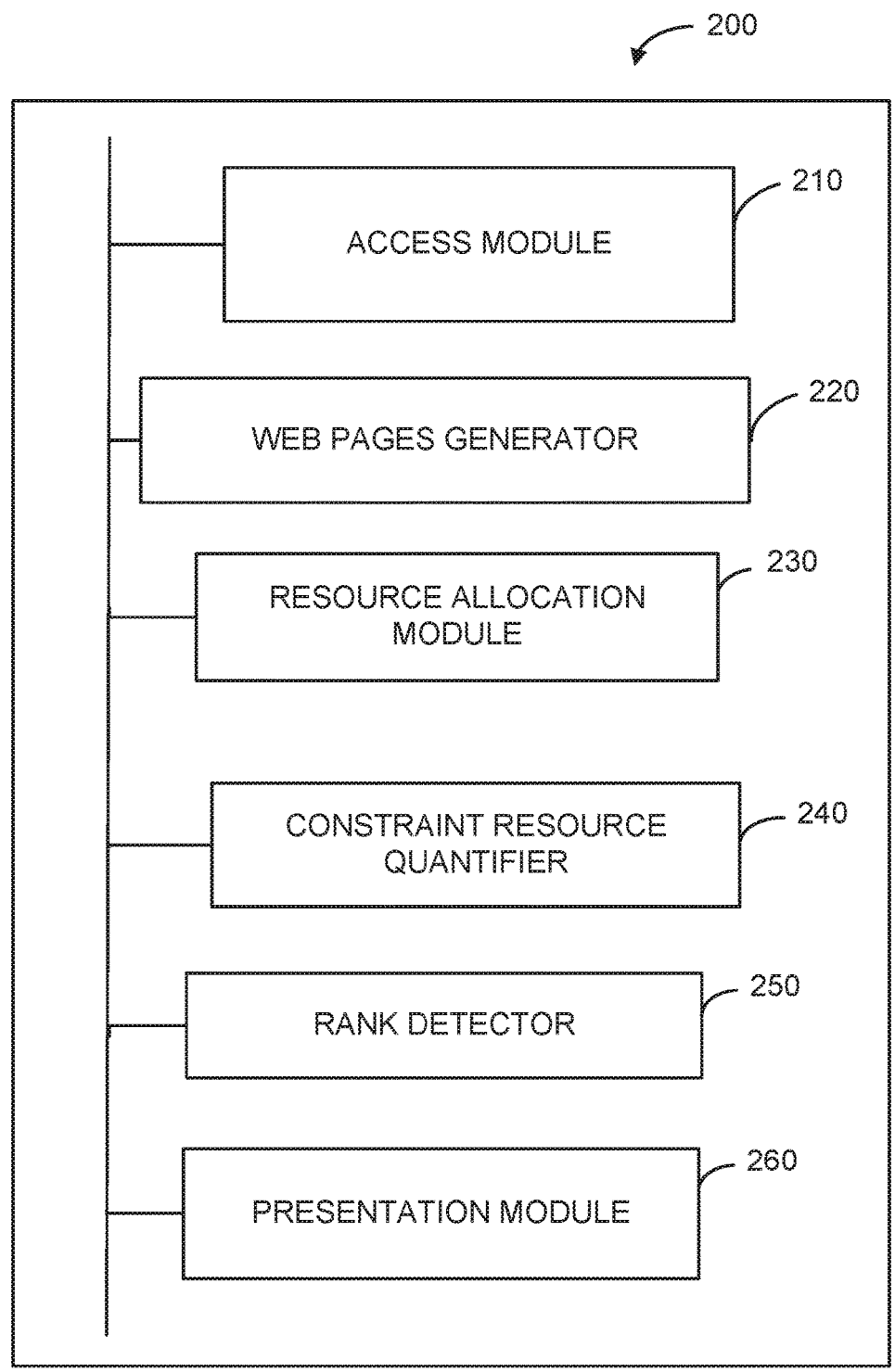
FIG. 2 is block diagram of a system to partition a limited resource amongst keywords in an on-line social network system, in accordance with one example embodiment.

FIG. 2 is a block diagram of a system 200 to partition a limited resource amongst keywords in the on-line social network system 142 of FIG. 1. As shown in FIG. 2, the system 200 includes an access module 210, a web pages generator 220, and a resource allocation 230.

The access module 210 is configured to access a set of keywords in an on-line social network system. Each keyword from the set of keywords represents a job search results (JSERP) web page. Each keyword from the set of keywords may be associated with a priority score generated in the on-line social network system 142 of FIG. 1. Each keyword from the set of keywords may be associated with a first metric representing a number of events of certain type observed in the on-line social network system over a certain period of time with respect a JSERP represented by the keyword. For example, the metric may represent a number of views in the associated with a JSERP.

The web pages generator 220 is configured to maintain authoritative web pages that can include a link to a JSERP represented by a keyword from the set of keywords. As explained above, the number of links to JSERPs that can be included into the authoritative web pages available within the on-line social network system 142 being a predetermined number. The web pages generator 220 is also configured to modify the authoritative web pages to include links to JSERPs represented by keywords from the set of keywords based on the allocation determined by the resource allocation module 230.

The resource allocation module 230 is configured to determine allocation of the predetermined number of links across keywords in the set of keywords in a manner that maximizes combined weighted gain in a metric associated with events of certain type observed in the on-line social network system with respect to JSERPs represented by keywords from the set of keywords utilizing respective priority scores of keywords in the set of keywords. The resource allocation module 230 may determine such allocation according to the condition expressed in Equation 2, and as described above. The resource allocation module 230 is configured to determine allocation of the predetermined number of links across keywords in the set of keywords utilizing respective priority scores generated for keywords in the set of keywords. As explained above, a priority score associated with a keyword generated based on a popularity score for the keyword that indicates how likely the subject keyword is to be included in a job-related search query as a search term and based on a relevance score for the keyword that expresses how likely a search that includes the keyword as a search term is to produce relevant results.

In one embodiment, the resource allocation module 230 is configured to determine allocation of the predetermined number of links across keywords in the set of keywords as follows: determine a first metric representing a number of events of certain type observed in the on-line social network system over a first period of time with respect a JSERP represented by a keyword from the set of keywords; determine a second metric representing a number of events of the certain type observed in the on-line social network system over a further period of time with respect the JSERP subsequent to adding a link to the JSERP from an authoritative web page in the on-line social network system; and determine weighted gain based on the first metric, the second metric, and a priority score of the keyword.

In a further embodiment, the resource allocation module 230 is configured to determine allocation of the predetermined number of links across keywords in the set of keywords as follows: include a link to a JSERP represented by the keyword; after a period of time, determine a new rank of the JSERP; and store the difference as gain for the keyword.

As described above, in the scenario where the resource allocation module 230 is to allocate zero or one link to any of the keywords representing a JSERP, the resource allocation module 230 is configured to determine allocation of the predetermined number of links across keywords in the set of keywords as follows: for each keyword from the set of keywords determine a respective weighted gain in the metric subsequent to adding a link to the associated JSERP from an authoritative web page in the on-line social network system 142, select the predetermined number of those keywords from the set of keywords with the highest respective weighted gains, and allocate one of the predetermined number of links to each keyword from the keywords with the highest respective weighted gains.

In the scenario where the resource allocation module 230 is to allocate zero or more links to any of the keywords representing a JSERP, the resource allocation module 230 is configured to determine allocation of the predetermined number of links across keywords in the set of keywords by solving the constrained optimization problem expressed in Equation 1 by breaking it down into a collection of simpler sub-problems, utilizing dynamic programming.

Also shown in FIG. 2 are a constraint resource quantifier 240, a rank detector 250, and a presentation module 260. The constraint resource quantifier 240 is configured to identify the predetermined number of links from the authoritative pages based on a number of the authoritative pages. The rank detector 250 is configured to determine respective ranks generated by a third party search engine for JSERPs represented by keywords. The presentation module 260 is configured to cause presentation of an authoritative web page that includes a link to a JSERP on a display device of a user. Some operations performed by the system 200 may be described with reference to FIGS. 3 and 4.

Figure 3:
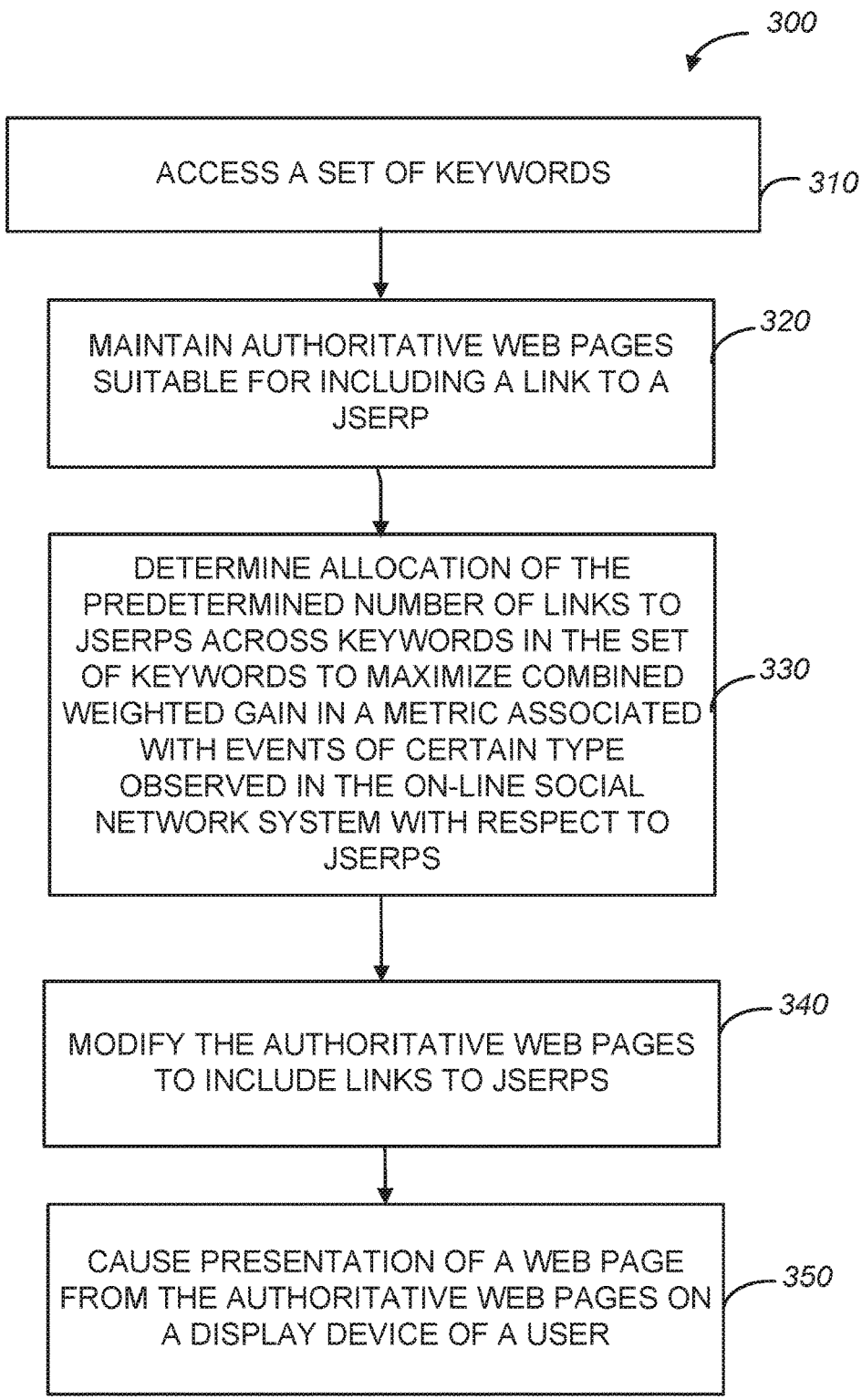
FIG. 3 is a flow chart illustrating a method to partition a limited resource amongst keywords in an on-line social network system utilizing a gain function that measures increase in the number of events associated with JSERPs, in accordance with an example embodiment.

FIG. 3 is a flow chart of a method 300 to partition a limited resource amongst keywords in the on-line social network system 142 of FIG. 1 utilizing a gain function that measures increase in the number of events associated with JSERPs. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the access module 210 of FIG. 2 accesses a set of keywords in an on-line social network system. At operation 320, the web pages generator 220 of FIG. 2 maintains authoritative web pages that are suitable for including into them a link to a JSERP represented by a keyword from the set of keywords. At operation 330, the resource allocation module 230 of FIG. 2 determines allocation of the predetermined number of links across keywords in the set of keywords in a manner that maximizes combined weighted gain in a metric associated with events of certain type observed in the on-line social network system with respect to JSERPs represented by keywords from the set of keywords utilizing respective priority scores of keywords in the set of keywords.

At operation 340, the web pages generator 220 modifies the authoritative web pages to include links to JSERPs represented by keywords from the set of keywords based on the allocation determined by the resource allocation module 230. The presentation module 260 of FIG. 2 causes presentation of an authoritative web page that includes a link to a JSERP on a display device of a user, at operation 350.

Figure 4:
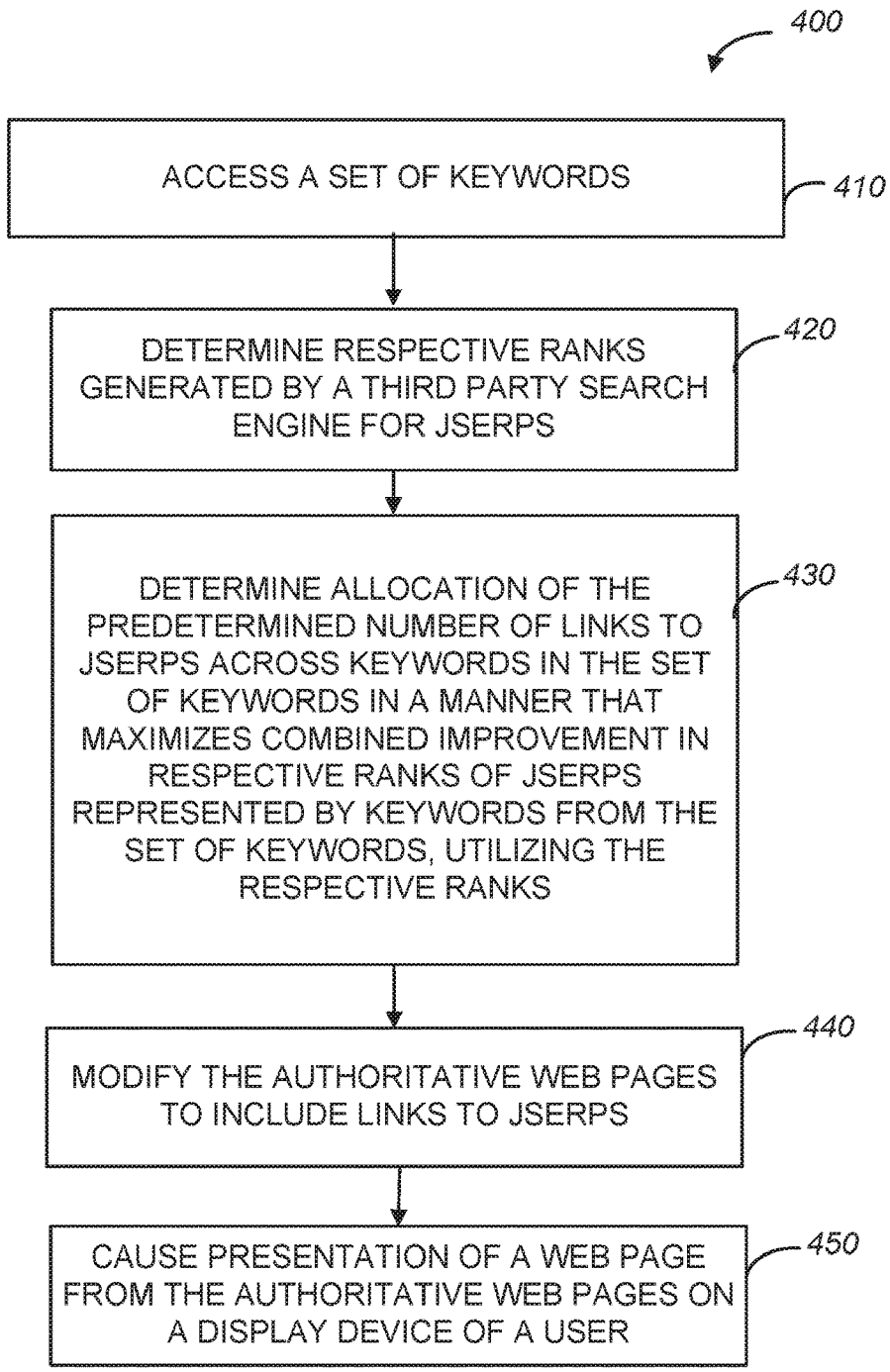
FIG. 4 is a flow chart illustrating a method to partition a limited resource amongst keywords in an on-line social network system utilizing a gain function that measures increase in respective ranks of JSERPs, in accordance with an example embodiment.

FIG. 4 is a flow chart of a method 400 to partition a limited resource amongst keywords in the on-line social network system 142 of FIG. 1 utilizing a gain function that measures increase in respective ranks of JSERPs. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 4, the method 400 commences at operation 410, when the access module 210 of FIG. 2 accesses a set of keywords in an on-line social network system. At operation 420, the rank detector 250 of FIG. 2 determines respective ranks generated by a third party search engine for JSERPs represented by keywords. At operation 430, the resource allocation module 230 of FIG. 2 determines allocation of the predetermined number of links across keywords in the set of keywords in a manner that maximizes combined improvement in respective ranks of JSERPs represented by keywords from the set of keywords, utilizing the respective ranks determined by the rank detector 250. At operation 440, the web pages generator 220 modifies the authoritative web pages to include links to JSERPs represented by keywords from the set of keywords based on the allocation determined by the resource allocation module 230. The presentation module 260 of FIG. 2 causes presentation of an authoritative web page that includes a link to a JSERP on a display device of a user, at operation 450.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 7:
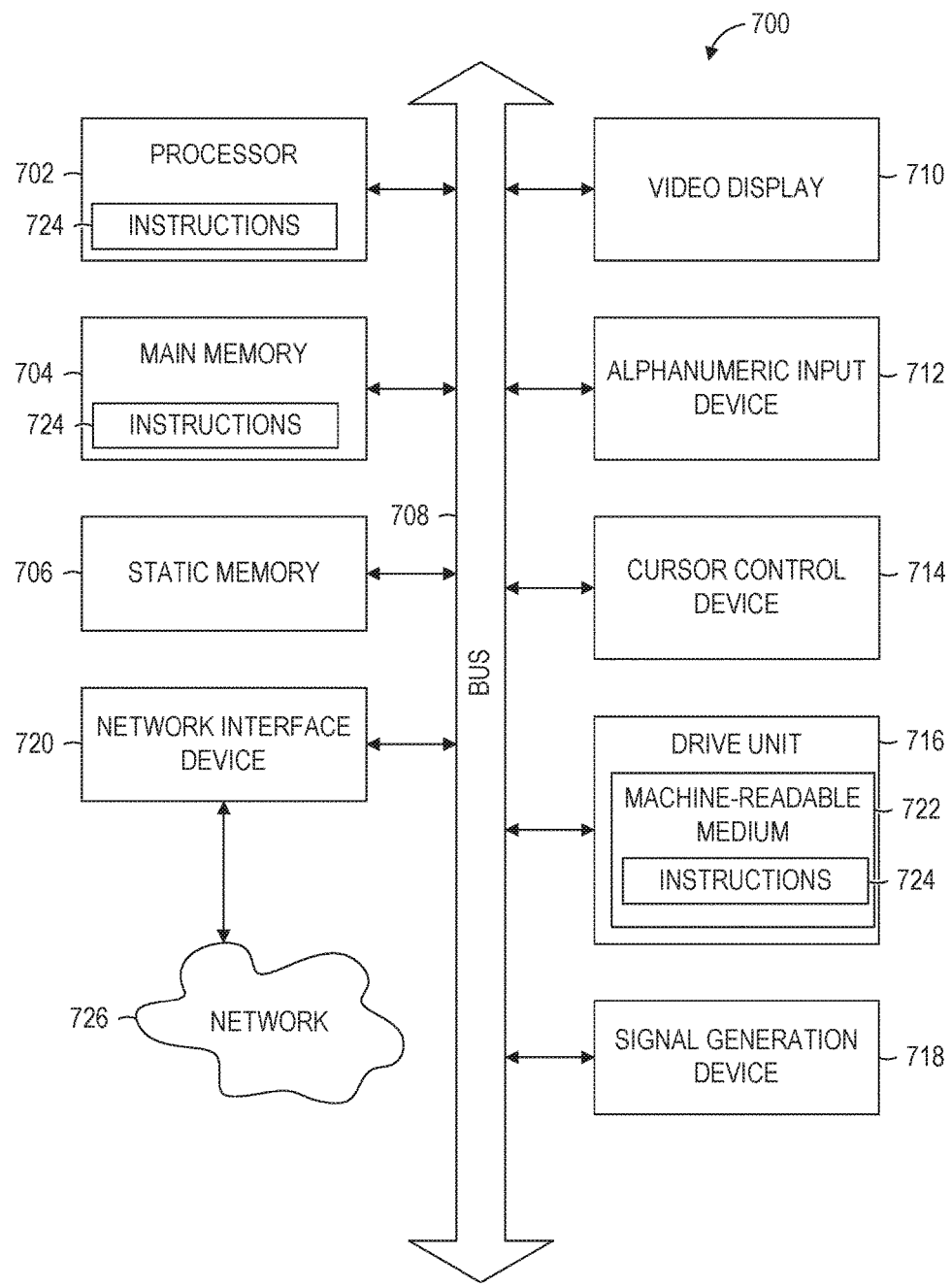
FIG. 7 is a diagrammatic representation of an example machine in the form of a computer system within which a set of instructions, for causing the machine to perform any one or more of the methodologies discussed herein, may be executed.

FIG. 7 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to partition a limited resource amongst keywords in an on-line social network system has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
accessing a set of keywords in an on-line social network system, each keyword from the set of keywords representing a job search results web page (JSERP);
determining respective ranks generated by a third party search engine for JSERPs represented by keywords from the set of keywords;
maintaining authoritative web pages suitable for including a link to a JSERP represented by a keyword from the set of keywords, a number of links to JSERPs that can be included into the authoritative web pages being a predetermined number;
using at least one processor, determining allocation of the predetermined number of links to JSERPs across keywords in the set of keywords in a manner that maximizes combined improvement in respective ranks of JSERPs represented by keywords from the set of keywords, utilizing the respective ranks;

modifying the authoritative web pages to include links to JSERPs represented by keywords from the set of keywords based on the determined allocation; and causing presentation of a web page from the authoritative web pages on a display device of a user, wherein the determining of the allocation of the predetermined number of links to JSERPs across keywords in the set of keywords comprises:

for each keyword from the set of keywords determining a respective weighted gain in the respective ranks of JSERPs subsequent to adding a link to an JSERP from an authoritative web page from the maintained authoritative web pages in the on-line social network system, selecting a predetermined number of keywords from the set of keywords with the highest respective weighted gains, and allocating one of the predetermined number of links to each keyword of the predetermined number of keywords from the set of keywords that have the highest respective weighted gains.

2. The method of claim 1, comprising identifying the predetermined number of links from the authoritative pages based on a number of the authoritative pages.

3. The method of claim 1, wherein the determining of the allocation of the predetermined number of links comprises, for a given keyword from the set of keywords comprises:

including a link to a JSERP represented by the given keyword;

after a period of time, determining a new rank generated by the third party search engine for the JSERP; and storing the difference in ranking as gain for the given keyword.

4. The method of claim 1, wherein the determining of the allocation of the predetermined number of links comprises utilizing respective priority scores generated for keywords in the set of keywords, a priority score associated with a subject keyword from the set of keywords generated based on a popularity score for the subject keyword that indicates how likely the subject keyword is to be included in a job-related search query as a search term and based on a relevance score for the subject keyword that expresses how likely a search that includes the subject keyword as a search term is to produce relevant results.

5. The method of claim 1, wherein the allocation of the predetermined number of links to JSERPs across keywords in the set of keywords comprises allocating zero or one link from the predetermined number of links to any keyword from the set of keywords.

6. The method of claim 1, wherein the allocation of the predetermined number of links to JSERPs across keywords in the set of keywords comprises allocating one or more link to a keyword from the set of keywords.

7. The method of claim 1, wherein the allocation of the predetermined number of links to JSERPs across keywords in the set of keywords comprises utilizing dynamic programming.

8. A computer-implemented system comprising:
one or more processors; and
a non-transitory computer readable storage medium comprising instructions that when executed by the one or processors cause the one or more processors to perform operations comprising:
accessing a set of keywords in an on-line social network system, each keyword from the set of keywords representing a job search results web page (JSERP);

determining respective ranks generated by a third party search engine for JSERPs represented by keywords from the set of keywords;

maintaining authoritative web pages suitable for including a link to a JSERP represented by a keyword from the set of keywords, a number of links to JSERPs that can be included into the authoritative web pages being a predetermined number;

determining allocation of the predetermined number of links to JSERPs across keywords in the set of keywords in a manner that maximizes combined improvement in respective ranks of JSERPs represented by keywords from the set of keywords, utilizing the respective ranks;

modifying the authoritative web pages to include links to JSERPs represented by keywords from the set of keywords based on the determined allocation; and causing presentation of a web page from the authoritative web pages on a display device of a user, wherein the determining of the allocation of the predetermined number of links to JSERPs across keywords in the set of keywords comprises:

for each keyword from the set of keywords determining a respective weighted gain in the respective ranks of JSERPs subsequent to adding a link to an JSERP from an authoritative web page from the maintained authoritative web pages in the on-line social network system, selecting a predetermined number of keywords from the set of keywords with the highest respective weighted gains, and allocating one of the predetermined number of links to each keyword of the predetermined number of keywords from the set of keywords that have the highest respective weighted gains.

9. The system of claim 8, comprising identifying the predetermined number of links from the authoritative pages based on a number of the authoritative pages.

10. The system of claim 8, wherein the determining of the allocation of the predetermined number of links comprises, for a given keyword from the set of keywords comprises:

including a link to a JSERP represented by the given keyword;

after a period of time, determining a new rank generated by the third party search engine for the JSERP; and storing the difference in ranking as gain for the given keyword.

11. The system of claim 8, wherein the determining of the allocation of the predetermined number of links comprises utilizing respective priority scores generated for keywords in the set of keywords, a priority score associated with a subject keyword from the set of keywords generated based on a popularity score for the subject keyword that indicates how likely the subject keyword is to be included in a job-related search query as a search term and based on a relevance score for the subject keyword that expresses how likely a search that includes the subject keyword as a search term is to produce relevant results.

12. The system of claim 8, wherein the allocation of the predetermined number of links to JSERPs across keywords in the set of keywords comprises allocating zero or one link to any keyword from the set of keywords.

13. The system of claim 8, wherein the allocation of the predetermined number of links to JSERPs across keywords in the set of keywords comprises allocating one or more link to a keyword from the set of keywords.

14. A machine-readable non-transitory storage medium having instruction data executable by a machine to cause the machine to perform operations comprising:

- accessing a set of keywords in an on-line social network system, each keyword from the set of keywords representing a job search results web page (JSERP);
- determining respective ranks generated by a third party search engine for JSERPs represented by keywords from the set of keywords;
- maintaining authoritative web pages suitable for including a link to a JSERP represented by a keyword from the set of keywords, a number of links to JSERPs that can be included into the authoritative web pages being a predetermined number;
- using at least one processor, determining allocation of the predetermined number of links to JSERPs across keywords in the set of keywords in a manner that maximizes combined improvement in respective ranks of JSERPs represented by keywords from the set of keywords, utilizing the respective ranks;
- modifying the authoritative web pages to include links to JSERPs represented by keywords from the set of keywords based on the determined allocation; and
- causing presentation of a web page from the authoritative web pages on a display device of a user, wherein the determining of the allocation of the predetermined number of links to JSERPs across keywords in the set of keywords comprises:
  - for each keyword from the set of keywords determining a respective weighted gain in the respective ranks of JSERPs subsequent to adding a link to an JSERP from an authoritative web page from the maintained authoritative web pages in the on-line social network system,
  - selecting a predetermined number of keywords from the set of keywords with the highest respective weighted gains, and
  - allocating one of the predetermined number of links to each keyword of the predetermined number of keywords from the set of keywords that have the highest respective weighted gains.

* * * * *